United States Patent [19]

Chlebina et al.

[11] Patent Number: 4,614,268
[45] Date of Patent: Sep. 30, 1986

[54] BEAD TRANSPORTING CONTAINER

[75] Inventors: Lawrence E. Chlebina; Steven J. Portalupi, both of Akron; Michael W. Smith, Brimfield, all of Ohio

[73] Assignee: The Goodyear Tire & Rubber Company, Akron, Ohio

[21] Appl. No.: 761,060

[22] Filed: Jul. 31, 1985

[51] Int. Cl.$^4$ .............................................. B65D 85/02
[52] U.S. Cl. .................................... 206/304; 206/445; 206/454; 206/0.82
[58] Field of Search ............... 206/445, 303, 454, 561, 206/304, 0.82

[56] References Cited

U.S. PATENT DOCUMENTS

| Re. 31,264 | 6/1983 | Holmes | 206/0.82 |
| 3,849,231 | 11/1974 | Brey et al. | 156/403 |
| 3,915,788 | 10/1975 | Hirata et al. | 156/403 |
| 3,982,989 | 9/1976 | Badenkov et al. | 156/403 |
| 4,095,608 | 6/1978 | Holmes | 206/0.82 |
| 4,369,086 | 1/1983 | Nakahama et al. | 156/403 |

Primary Examiner—Joseph Man-Fu Moy
Attorney, Agent, or Firm—Frederick K. Lacher; M. W. Goodwin

[57] ABSTRACT

A generally cylindrical wall member (14) of resilient material has an opening (22) extending axially of the container (10) for inserting beads (12) into individual compartments (54) in the container (10). Axially extending sides (30) of the wall member (14) are resiliently movable radially outwardly to grip and hold the beads (12) during transporting. The curvature of the sides (30) is such that a range of different diameter beads (12) can be accommodated. The wall member sides (30) are also resiliently yieldable radially outwardly to permit removal of the beads (12) during movement of the container (10) in a radial direction away from the beads (12) after they are placed around a bead support of a bead storing and feeding apparatus.

9 Claims, 2 Drawing Figures

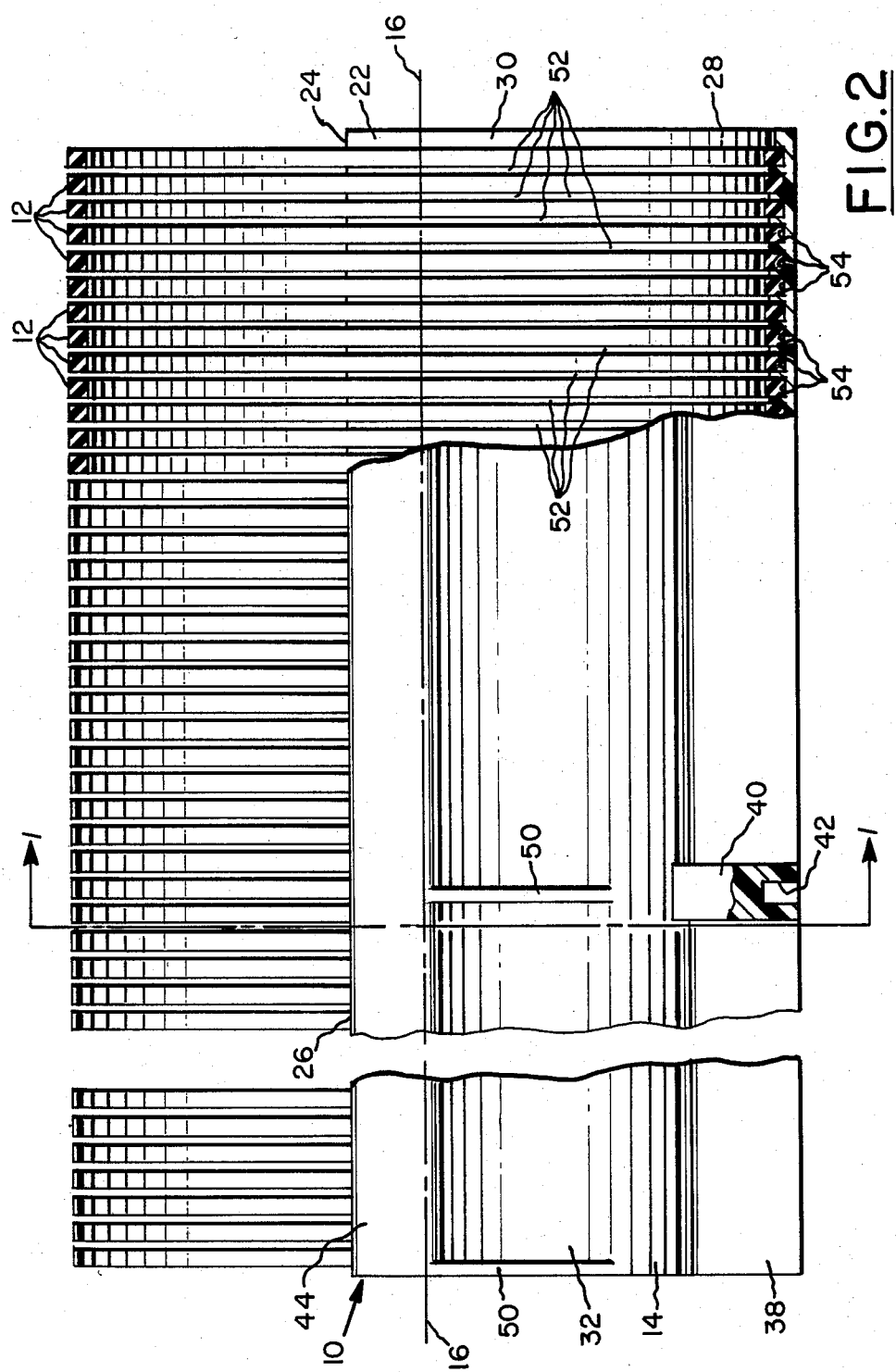

BEAD TRANSPORTING CONTAINER

This invention relates generally to building pneumatic tires wherein annular beads are made by winding wire into bead rings which are then transported to a tire building machine for assembly with the plies and other tire components into a green tire. The green tire may then be placed in a mold and vulcanized.

In the manufacture of tires it is important that the beads be made with precision and then stored and transported without distortion. Heretofore one portable bead storage rack had chains with clips for holding the beads in a separated stacked relationship. This bead storage rack also was a bead loader having mechanism for moving the chains to fill the storage rack and then feed the beads out of the storage rack. The storage rack also had to be maintained in a vertical position as the beads were supported by gravity on the clips at the edges.

In other prior art containers the beads have been stored on pin trucks where the beads are in contact with each other and must be separated before use at the tire machine.

In the manufacture of certain bead rings it has been found that it is important to handle the beads separately so that they do not stick together. This is especially true of beads which are jammed or crimped in accordance with the disclosure in U.S. Pat. No. 4,452,660 dated June 5, 1984 of Davis et al and in allowed Divisional patent application Ser. No. 593,561 filed Mar. 26, 1984, now issued as U.S. Pat. No. 4,496,411 dated Jan. 29, 1985 assigned to the Assignee of this application. The beads made with this equipment and process are not wrapped and are preferably not stacked or positioned close together. Accordingly, the apparatus of this invention is directed toward transporting beads to a tire bead storing and feeding apparatus in a container having separating ribs for holding the beads during transporting and having resilient walls permitting insertion of the beads in the container, providing for gripping of the beads during transporting and permitting removal of the beads after they are placed around an internal bead support of the bead storing and feeding apparatus and the container is pulled radially away from the internal bead support.

In accordance with an aspect of the invention there is provided a container for storing and transporting annular tire beads comprising a generally cylindrical wall member disposed about a central axis at the intersection of the midplane and center plane of the wall member, an opening in the wall member extending axially of the container providing spaced-apart axially extending wall member side portions and a wall member center portion, the wall member being of a resilient material to provide for yieldably spreading the wall member side portions for gripping the annular tire beads during transporting and storing and for removal of the tire beads from the container.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiment shown and described herein is illustrative and as will become apparent to those skilled in these arts can be modified in numerous ways within the spirit and scope of the invention defined in the claims hereof.

In the drawings:

FIG. 2 is a side elevation of the container shown in FIG. 1 with parts broken away and showing a partial section along the line 2—2 in FIG. 1.

Figure 1:
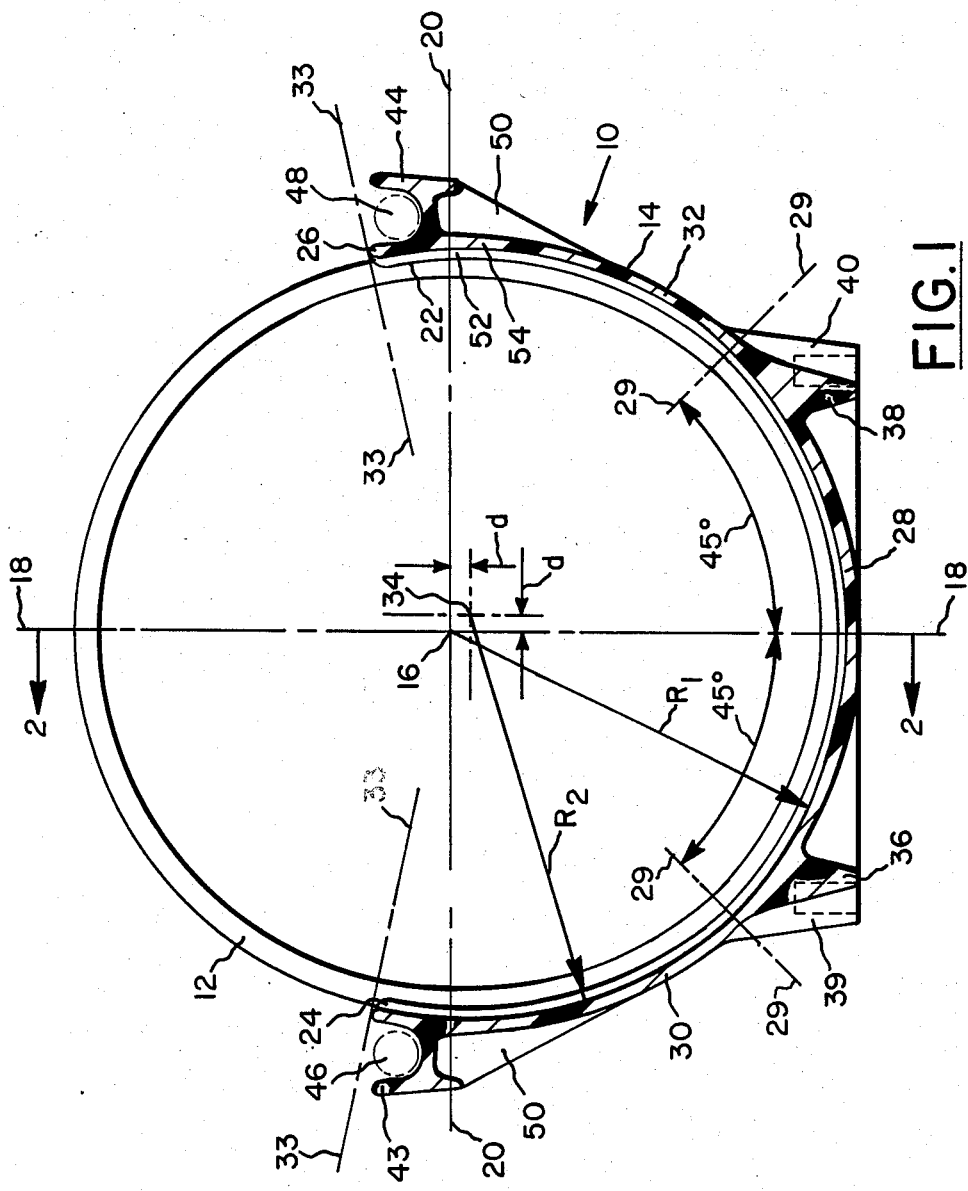
FIG. 1 is a sectional view of the container embodying the invention taken along line 1—1 in FIG. 2 showing bead rings in the container.

Referring to the drawings and especially FIGS. 1 and 2, a container 10 for storing and transporting annular tire beads 12 is shown. The container 10 is a generally cylindrical wall member 14 with a central axis 16—16, a center plane 18—18 extending through the central axis in a generally vertical direction and a midplane 20-20 extending through the central axis in a generally horizontal direction and at right angles to the center plane.

An axially extending opening 22 is provided between edges 24 and 26 located on the wall member 14 at opposite sides of the center plane 18—18 and above the midplane 20—20. The wall member 14 has a wall member center portion 28 extending over an arc of 45 degrees between planes 29—29 on either side of the center plane 18—18. Between the center portion 28 and the edges 24 and 26 of the opening 22 are wall member side portions 30 and 32. Preferably the wall member side portions 30 and 32 extend above the midplane 20—20 a distance encompassing an arc of not over 15 degrees measured from the midplane to planes 33—33 connecting the central axis 16—16 and the respective edges 24 and 26 of the opening 22. In the embodiment shown, the side portions 30 and 32 extend above the midplane 20—20 to planes 33—33 a distance encompassing an arc of about 12 degrees.

Radius of curvature R1 of the wall member center portion 28 is substantially the same as the outer diameter of the largest bead 12 to be transported and stored by the container 10. This radius of curvature R1 is measured from the central axis 16—16.

The following description relates to wall member side portion 30; however, this description may also be applied to wall member side portion 32 except that the wall member side portion is on the opposite side of the center plane 18—18. Wall member side portion 30 has a radius of curvature R2 about an axis 34 offset from the center plane 18—18 in a direction toward the opposite side portion 32 and offset from the midplane 20—20 in a direction toward the center portion 28. Preferably the radius of curvature R2 of the wall member side portion 30 is the same as the radius of curvature R1 of the center portion 28 and this is equal to the radius of the outer circumference of the largest bead 12 to be transported and stored by the container 10. Preferably the axis 34 is offset from the center plane 18—18 and the midplane 20—20 a distance d equal to about one-half the difference between the outer diameter of the smallest and the largest annular beads 12 to be transported and stored by the container 10.

As shown in FIGS. 1 and 2, axially extending ribs 36 and 38 are mounted at the radially outer surface of the wall member center portion 28 to support the container 10 when it is placed on a flat surface. Thickened portions 39 and 40 of the ribs 36 and 38, respectively, may be provided for reinforcing the ribs where they contain positioning holes 41 and 42, respectively. The positioning holes 41 and 42 are for alignment with positioning pins on loading equipment (not shown) to locate the container at a predetermined loading position.

Axially extending channels 43 and 44 may be positioned at the radially outer surface of the wall member side portions 30 and 32 adjacent the edges 24 and 26 of the opening 22 for receiving spreader bars 46 and 48, shown in phantom lines, or other similar devices for spreading the side portions during loading of the container 10. Gussets 50 mounted on the wall member side portions 30 and 32 provide support for the channels 43 and 44 at spaced-apart positions such as the ends and middle of the container 10 as shown in FIG. 2. Alternatively, the container 10 may be made without the channels 43 and 44 and the beads 12 inserted by reducing the diameter in one plane as by elongation of the beads for insertion between the side portions 30 and 32.

To ensure separation of the beads 12 in the container 10, separating members such as ribs 52 are located at spaced-apart positions axially of the wall member 14 and extend in radial planes from at least the intersection of the midplane 20—20 and the wall member side portion 30 to the intersection of the midplane and the other wall member side portion 32. The spacing of the ribs 52 is sufficient to provide compartments 54 for accommodating the greatest width of the beads 12 to be transported and stored by the container 10. The height of the ribs 52 is approximately the same as the thickness of the wall member 14 and does not exceed the minimum radial thickness of the beads 12. The thickness of the wall member side portions 30 and 32 is preferably not greater than 3 percent of the radius of curvature R1.

Preferably the container 10 is made for one size bead 12; however, for each size bead there are a number of different bead constructions and the beads in that size may have outside diameters varying between 0.50 and 0.75 inches (1.27 and 1.91 cm) over the nominal bead diameter. Examples of nominal bead diameters are 12, 13, 14 and 15 inches. In the present embodiment, the variation is 0.601 inches (1.53 cm). As stated above, the radius of curvature R1 of the wall member center portion 28 and the radius of curvature R2 of the wall member side portions 30 and 32 are the same as the radius of the outer circumference of the largest bead 12 to be transported by the container 10. When the largest bead 12 is placed in the container 10, the side portions 30 and 32 are spread apart by the spreader bars 46 and 48 or similar means and when contracted there will be substantially 100 percent surface contact between the bead and wall member side portions 30,32 and wall member center portion 28. For beads 12 of lesser diameter, the outer surface of the bead will contact equal surfaces at the center portion 28 and side portions 30 and 32 when the spreader bars 46 and 48 are moved toward each other to permit the wall member side portions 30 and 32 to move radially inward into engagement with the smaller beads.

The wall member 14 is made of a resilient material such as polyurethane and the material of the preferred embodiment is 20 percent glass-filled urethane sold under the trade name Union Carbide-RIM 160. Another material which may provide the desired resilience is a polycarbonate sold under the name "Lexan".

When the container 10 is loaded, it is transported to a storing and feeding apparatus such as that shown and described in copending patent application Ser. No. 761,181, filed on the same date as this application and entitled "Method and Apparatus for Storing and Feeding Tire Beads". This apparatus has an internal bead support over which the beads 12 held in the container 10 can be positioned. The internal bead support may be expanded to grip the beads 12 and hold them in the spaced positions shown in FIG. 2. The container 10 may then be pulled radially away from the internal support leaving the beads 12 gripped by the support. The resilience of the wall member 14 permits the side portions 30 and 32 to be spread apart during this radial movement without damaging the beads 12 or changing the spacing between the beads.

While a certain representative embodiment and details have been shown for the purpose of illustrating the invention, it will be apparent to those skilled in the art that various changes and modifications may be made therein without departing from the spirit or scope of the invention.

What is claimed is:

1. A container for storing and transporting annular tire beads having substantially the same inner diameter and different outside diameters and which are of the type that cannot be stacked or positioned close together because they stick together comprising a generally cylindrical wall member disposed about a central axis at the intersection of the midplane and center plane of said wall member, an opening in said wall member extending axially of said container providing spaced-apart axially extending wall member side portions and a wall member center portion, said wall member center portion having a first radius of curvature about said central axis and each of said wall member side portions having a second radius of curvature substantially the same as said first radius of curvature, said second radius of curvature having an axis offset from said center plane in a direction toward the opposite side portion and offset from said midplane in a direction toward said center portion, said wall member being of a resilient material to provide for yieldably spreading said wall member side portions for gripping said annular tire beads during transporting and storing and for removal of said tire beads from said container and separating members at spaced-apart positions axially of said wall member for preventing axial movement of said annular tire beads contained in compartments between said separating members so that they do not stick together.

2. A container in accordance with claim 1 wherein the depth of said compartments does not exceed the minimum radial thickness of said tire beads so that an internal bead support may grip said tire beads and hold them in spaced positions.

3. A container in accordance with claim 1 wherein each of said side portions has a radius of curvature which is substantially the same as the radius of curvature of said center portion and has an axis offset in both of said directions a distance equal to about one-half the difference between the outer diameters of the smallest and the largest of said annular beads to be transported and stored by said container.

4. A container in accordance with claim 1 wherein said separating members are equally spaced ribs extending in radial planes from the intersection of said midplane and one of said wall member side portions to the intersection the midplane and of the other of said wall member side portions.

5. A container in accordance with claim 1 wherein axially extending ribs are provided at the radially outer surface of said wall member center portion to support said container when it is placed on a flat surface and at the same time permit flexibility of said wall member side portions for resilient movement thereof.

6. A container in accordance with claim 5 wherein said axially extending ribs have positioning holes for alignment with positioning pins to locate said container at a predetermined position.

7. A container in accordance with claim 6 wherein said positioning holes are located in thickened portions of said axially extending ribs.

8. A container in accordance with claim 5 wherein axially extending channels are positioned at said outer surface of said wall member side portions adjacent said edges of said opening for receiving spreader bars and at the same time provide flexibility of said wall member side portions at positions spaced from said edges.

9. A container in accordance with claim 1 wherein said resilient material of said wall member is polyurethane.

* * * * *